Aug. 17, 1965

K. H. SUN 3,201,590

DISCRIMINATING RADIATION DETECTOR FOR DETERMINING A GIVEN
RADIATION IN THE PRESENCE OF OTHER RADIATIONS
Filed Dec. 4, 1958

INVENTOR
Kuan H. Sun
BY
Donald Smith
ATTORNEY 3,201,590
DISCRIMINATING RADIATION DETECTOR FOR DETERMINING A GIVEN RADIATION IN THE PRESENCE OF OTHER RADIATIONS
Kuan H. Sun, Wilkinsburg, Pa., assignor to Westinghouse Electric Corporation, East Pittsburgh, Pa., a corporation of Pennsylvania
Filed Dec. 4, 1958, Ser. No. 778,116
12 Claims. (Cl. 250—83.3)

The present invention relates to radiation detectors and more particularly to devices for measuring neutronic flux density associated with a source of neutrons.

Neutrons are subatomic particles possessing a mass slightly in excess of hydrogen atoms, but having no electrical charge. Therefore, their detection is impossible by means of Geiger-Muller counters and similar radiation detectors, which depend solely upon ionization induced by charged particles in a gaseous filling of the detector. Although radiation detectors, known as scintillation counters or $BF_3$ counters, which are capable of producing light output upon impingement neutrons, are known, these devices frequently are relatively large in size, and therefore cannot be used in applications where space is at a premium. Moreover, the last mentioned detectors require complicated amplifying equipment which not only is expensive but also space-consuming. Fission counters also have been employed to measure neutrons but suffer from most of the aforementioned disadvantages. In addition, most counters or detectors usually produce a background output as a result of the presence of gamma and fast neutron radiations.

It is therefore an object of the invention to provide a novel and efficient radiation detector. More specifically, it is an object of the invention to provide a radiation detector having means sensitive to a given type of radiation and also an arrangement for cancelling out the effects of other radiations in order to render the detector insensitive to other than the given radiation.

Another object of the invention is the provision of an improved neutronic flux meter adapted particularly for measuring slow or thermal neutrons.

Another object of the invention is the provision of a neutronic flux meter which is completely insensitive to gamma and fast neutron radiation.

A further object of the invention is the provision of a radiation detector requiring a minimum of external circuitry for the operation thereof.

Still another object of the invention is the provision of a radiation detector for those applications wherein compactness and simplicity of construction are prime requisites.

The foregoing and other objects, features and advantages of the invention will be described more fully during the forthcoming description of illustrative embodiments of the invention with the description being taken in conjunction with the accompanying drawings wherein.

In brief, the invention comprises opposed semiconductor devices, particularly of the P-N junction type, fabricated from a material such as germanium or silicon. Means are associated in opposition with the outputs, respectively, of the semiconductor devices which are equally sensitive to gamma and fast neutronic radiation so that the effects of these radiations upon the detector are cancelled out. However, only one of the aforementioned means is sensitive to slow or thermal neutronic flux so that when the detector is disposed in a neutronic flux an output current is generated which is proportional only to the thermal flux density of the neutronic flux.

Figure 1:
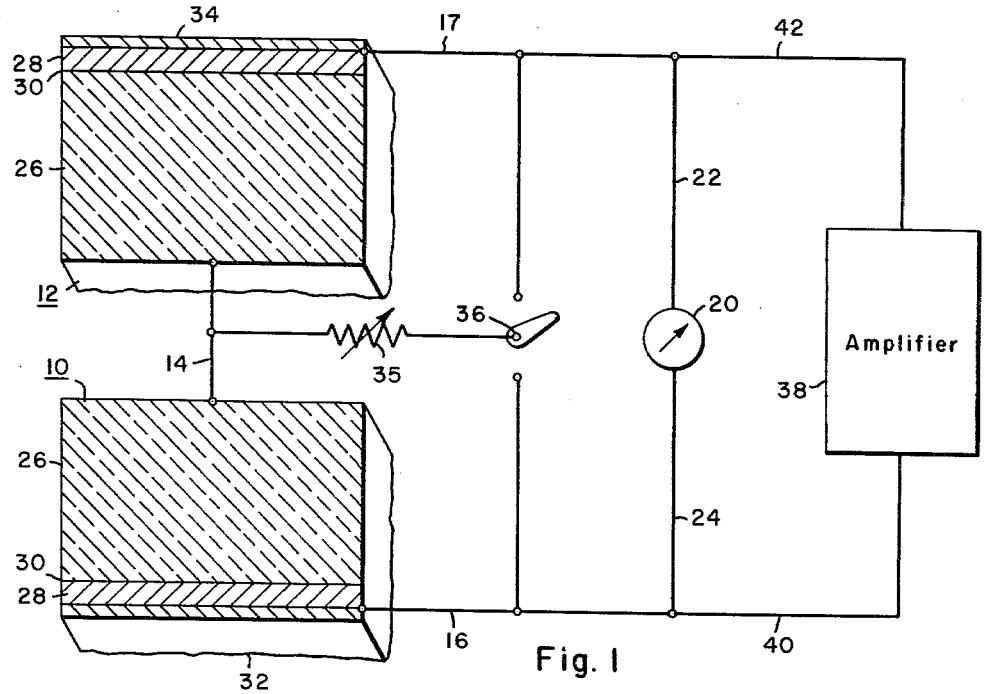
FIGURE 1 is a schematic circuit and structural diagram of one form of radiation detector arranged in accordance with the invention.

As shown in FIG. 1 of the accompanying drawings, the invention comprises a pair of semiconductor devices 10 and 12 formed in any suitable size and shape and adapted for positioning in a source of neutrons. The devices 10 and 12 are connected electrically in opposition by means of conductors 14, 16 and 17, with differential output of the devices being applied to an indicating instrument such as a micro- or milli-ammeter 20 connected through electrical leads 22 and 24 to the conductors 16 and 17, respectively. The current measuring meter 20 is provided with appropriate sensitivity for the particular range of neutronic flux to be measured, but desirably does not have a resistance greater than that of the P-N junction of either of the aforementioned semiconductor devices 10 and 12 at zero current and voltage.

The devices 10 and 12 are each composed of a N-type region 26 and a P-type region 28 forming an intermediate P-N junction 30. The outwardly disposed surface of the P region 28 of the device 10 is covered by a layer 32 of a material capable of emitting charged particles upon impingement of neutrons in the thermal region while the P-type region of the other device 12 is similarly covered with a layer 34 of a chemically and physically similar but nuclearly different material which is comparatively unaffected by thermal neutrons. These materials, however, are substantially equally affected by gamma and fast neutronic radiation for reasons pointed out previously. The region 28 should be thin enough so that the charged particles can penetrate the neighborhood of the junction 30 and the electrons and positive ions formed can diffuse into the junction without difficulty.

As is generally understood in the art of semiconductors, a P-type region has "positive" characteristics and an N-type region has "negative" characteristics. The material comprising the P and N type regions 28 and 26 may be germanium, silicon or any semiconducting crystal or composition in or on which a surface P-N junction may be formed. Alternatively, a combination of crystals, grown P-N junctions, or those made by other methods may be employed.

In one arrangement of the invention, the charged particle emitting layer 32 comprises a quantity of an alpha-emitting isotope such as boron-10, or lithium-6 which upon impingement of slow neutrons yields alpha particles or tritons in accordance with the nuclear reaction $B^{10}$ (n, $\alpha$)$Li^7$, or $Li^6(n,\alpha)H^3$. The resultant alpha particles or tritons being high energy, charged particles induce an ionization-voltaic effect upon the P-N junction 30 of the semiconductor device 10. The electrons and ions are separated at the junction 30 with the electrons being disposed at the N region 26 and the ions or holes at the P region 28.

In the aforementioned arrangement of the invention, the layer 34 of the opposed semiconductor device 12 comprises a similar quantity of a thermoneutronically unreactive material, such as the boron-11 isotope, but which is otherwise similar to the charged particle emitting layer 32. Boron-11 has a thermoneutronic capture cross-section of less than 0.05 barn, while the capture cross-section of boron-10 for thermal neutrons is 4,020 barns. Thus, virtually no ionization-voltaic current is induced in the semiconductor device 12 as a result of thermal neutronic flux. However, the boron-10 and boron-11 are equally sensitive to gamma and fast neutronic radiation, and, therefore, the differential output of the devices 10 and 12, as a result of the latter-mentioned radiations, is exactly cancelled inasmuch as the devices 10 and 12 are connected in opposition as pointed out previously.

On the other hand, the ionization-voltaic effect induced by thermal neutrons occurs solely in the semiconductor device 10 which is provided with the boron-10 isotope. Therefore, the net or differential output of the devices 10 and 12 is exactly proportional to the thermal neutronic flux density.

It will be seen, then, that the output of the devices 10 and 12 is unaffected by fast neutrons, gamma rays or other background radiation, assuming that the devices 10 and 12 are placed at the same location. It will be obvious to those familiar with semiconductor devices, that the devices 10 and 12 can be made extremely small or of any other desired size or configuration depending upon the application of the invention.

The thicknesses of the coatings 32 and 34 desirably are identical and are not greater than equal to the range of alpha particles emitted in the boron-10 layer 32, in order to prevent retention of alpha particles therein. Alternatively, where germanium materials are employed in the P and N regions 26 and 28, the $B^{10}$ and $B^{11}$ isotopes can be admixed with the P regions 28 of the devices 10 and 12, respectively, where the boron will serve as an electron acceptor in the P region 28 of each semiconductor. In the latter arrangement, the acceptor characteristics of the $B^{10}$ and $B^{11}$ isotopes are identical, while on the other hand, the aforementioned ionization-voltaic effect of the boron-10 isotope in a thermal neutronic flux would occur only in the P region 28 of the device 10, as explained previously.

In many applications, the differential output of the devices 10 and 12 can be read directly by the micro- or milli-ammeter 20 without the use of external amplification or power supplies. However, the output signal of the devices 10 and 12 can be amplified by conventional amplifying circuitry designated generally by the reference numeral 38 and labeled "amplifier" in FIG. 1. The amplifier 38 desirably is connected across the output terminals of the devices 10 and 12 by means of conductors 40 and 42.

A variable resistance 35 can be inserted, if desired, across the terminals of either one of the semiconductor devices 10 or 12 through a two way switch 36. The resistance 35, when used, is employed in order to balance any difference in current flow between the devices 10 and 12 due to unknown physical differences that may be present or introduced during the preparation of the identical semiconductor devices.

Figure 2:
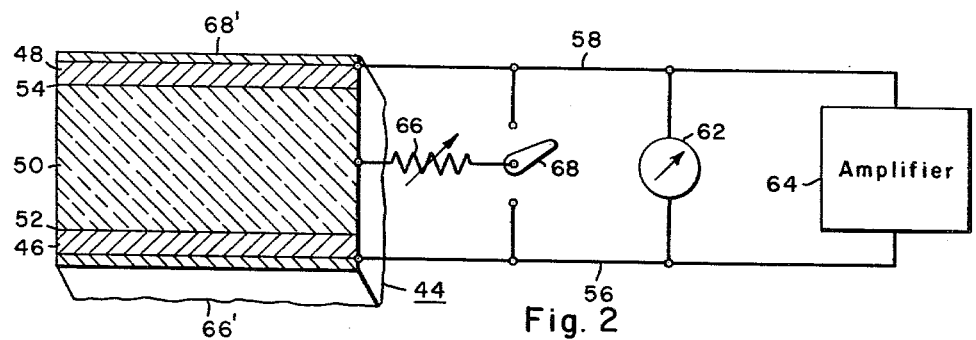
FIG. 2 is a schematic structural and circuit diagram of another form of radiation detector according to the invention.

Referring now to FIG. 2 of the drawings, the radiation detector of the invention is arranged in conjunction with a junction-type transistor 44. In this example, the transistor 44 includes P regions 46 and 48 separated by an N region 50. The P regions 46 and 48 are made relatively thin for the reason pointed out heretofore in connection with the region 28 (FIG. 1). The transistor 44 is a junction-type device in which a pair of junctions 52 and 54 are formed between the N region 50 and the adjacent P regions 46 and 48, respectively. The transistor 44 additionally can be fabricated in a known manner from germanium or silicon materials, as mentioned previously in connection with the semiconductor devices 10 and 12. The output of the transistor 44 is coupled by a pair of leads 56 and 58 to a micro- or milli-ammeter 62.

The external circuitry of the transistor 44 can be modified in a manner similar to that described in connection with FIG. 1, for example, by connecting an amplifier 64 across the micro- or milli-ammeter 62. A variable resistance 66 is connected between the N region 50 of the transistor 44 and the output leads 56 and 58 thereof through a two way switch 68 and is used to balance out any current differential, as explained previously in connection with the resistance 35 and switch 36 (FIG. 1).

In this arrangement, the P regions 46 and 48 are provided with external coatings 66' and 68', respectively. The coating 66' contains a thermal-neutron reactive material, such as that described in connection with the layer 32 of FIG. 1, while the coating 68' contains a similar quantity of material which is virtually insensitive to thermal neutrons but which is equally sensitive to fast neutrons, gamma radiation, or other confusing background radiation. The coatings 66' and 68', as well as the layers 32 and 34 of FIG. 1, can be applied by any suitable coating method as, for example, by plating, vapor deposition or as a paste or suspension depending upon the thickness desired.

Assuming that the coatings 66' and 68' contain equivalent quantities of the $B^{10}$ and $B^{11}$ isotopes, respectively, an ionization-voltaic effect will be produced by alpha particles from the coating 66' when the transistor 44 is disposed in a thermal neutronic flux. As a result, these alpha particles will cause the electron-hole pairs of the transistor 44 to be separated at the junction 52 with the electrons going to the N region 50 and the ions or holes migrating to the P region 46. Since only the coating 68' is sensitive to thermal neutrons as aforesaid, the effect of the resultant ionization induced by the thermal neutrons will not be offset by a similar reaction at the junction 54. Therefore, when the transistor 44 is exposed to thermo-neutronic flux, an output current will appear in the conductors 56 and 58, which current is measurable by the meter 62.

On the other hand, the ionization-voltaic effects of gamma and other background radiation will be induced equally in the P regions 46 and 48, and, therefore, the effect of the latter-mentioned ionizations will be exactly canceled. Therefore, no background signal will appear in the output of the transistor 44.

It is contemplated that the $B^{10}$ and $B^{11}$ isotopes included in the coatings 66' and 68' can be admixed directly with the material comprising the P regions 46 and 48, respectively, where either the $B^{10}$ or $B^{11}$ isotope will serve equally as an electron acceptor in the P region 46 or 48. It is also contemplated that an N-P-N transistor (not shown) can be employed instead of the P-N-P transistor 44. However, this arrangement is less desirable inasmuch as the alpha particles emitted by the $B^{10}$ isotope would slowly convert the N type germanium to the P type.

It will be obvious that other pairs of materials can be employed, one of which is sensitive to the desired radiation and both of which are equally sensitive to unwanted background radiation. For example, the coating 32 or 66' can include a quantity of the isotope lithium-6 while the coating 34 or 68' includes an equivalent amount of lithium-7. The thermal neutronic cross section of lithium-6 is 945 barns, while that of its sister isotope $Li^7$ is 0.033 barn. Thus, it will be seen that the sensitivity to thermal neutrons of lithium-6 likewise is many times greater than that of lithium-7, and, therefore, an output equivalent to thermal neutronic flux is obtained in a similar manner to that described heretofore in connection with the coatings 32 and 34, or 66' and 68'. Lithium-6 reacts with impinging thermal neutrons in accordance with the following reaction: $Li^6$ $(n,\alpha)T^3$, which yields high energy tritons. In this case, the thicknesses of the coatings 32 and 34 or 66' and 68' are not greater than the range of the tritons in lithium.

Also within the contemplation of the invention is the use of fissionable and non-fissionable sister isotopes in the coatings 32 and 34, or 66' and 68', respectively. Thus, the coating 32 or 66' can include a quantity of uranium-235 while the non-fissioning uranium-238 isotope can be utilized in the coating 34 or 68'. The thermal-fission cross section of $U^{235}$ is 582 barns, while that of the $U^{238}$ is practically zero. Thus, the coating 32 or 66' will be several times more sensitive to thermal neutrons while both isotopes are approximately equally sensitive to fast neutrons. As a result, an output current of the devices 10 and 12 or of the transistor 44 will be proportional to thermal neutronic flux as a result of the ionization-voltaic effect of charged fission fragments produced in that junction 30 or 52 which is adjacent the coating 32 or 66', respectively.

Figure 3:
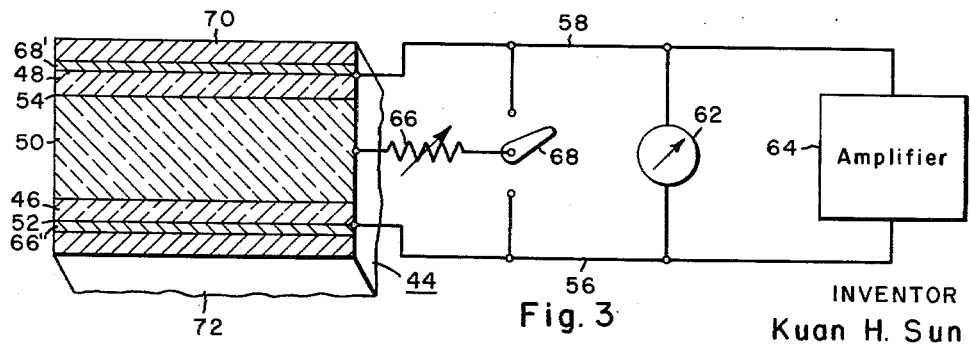
FIG. 3 is a schematic structural and circuit diagram of still another form of radiation detector according to the invention.

With reference now to FIG. 3, wherein similar reference characters indicates similar parts, a radiation detector is disclosed in accordance with the invention and is sensitive only to fast neutrons. In furtherance of this purpose, a layer 70 of moderating material such as paraffin or other hydrogenous material is disposed adjacent the thermal neutron-reactive coating 68'. The moderating layer 70, of course, slows the fast neutrons to thermal energies whereat they can react with the coating 68' to release charged particles in the manner described previously. A similar layer 72 of moderating material is disposed adjacent the non-reactive coating 66' to ensure that both junctions 52 and 54 are equally sensitive to gamma and other background radiation. Alternatively, carbon, beryllium, or other known moderating materials can be employed for forming the layers 70 and 73 providing that these layers are substantially identical.

From the foregoing it will be seen that novel and efficient arrangements of radiation counters have been described herein. The descriptive and illustrative matter employed herein is intended solely for exemplifying the invention and should not be interpreted as limitative thereof. Moreover, it is to be understood that certain features of the invention can be employed without a corresponding use of other features.

Therefore, what is claimed as new is:

1. A radiation detector comprising opposed semiconductor devices, each of said devices having P and N type regions and a junction therebetween, circuit means for connecting the outputs of said devices in opposition, a quantity of neutron-reactive material, said material being supported by one of said devices in proximity to its output region, a quantity of neutron insensitive material, said last-mentioned material being supported by the other of said devices in proximity to its output region, and means for measuring the differential output of said devices.

2. A radiation detector comprising a pair of opposed semiconductor devices, each of said devices having P and N type regions and a P-N junction therebetween, circuit means for connecting the P regions of said devices in electrical opposition, a quantity of neutron reactive material, said material being supported by one of said devices in proximity to its P region, a quantity of neutron insensitive material, said last-mentioned material being supported by the other of said devices in proximity to its P region, said materials being substantially equally sensitive to background radiation such as gamma rays, and means for indicating the differential output of said P regions.

3. A radiation detector comprising a transistor having a plurality of positive and negative regions and a pair of junctions therebetween, circuit means connected to the output regions of said transistor for indicating the output thereof, a quantity of neutron reactive material, said material being supported by said transistor in proximity to one of its output regions, a quantity of neutron insensitive material, said last-mentioned material being supported by said transistor in proximity to the other of said output regions, said materials being substantially equally sensitive to background radiation such as gamma rays.

4. A radiation detector comprising a pair of semiconductor devices, each of said devices having P and N type regions and a P-N junction therebetween, circuit means coupled to the output regions of said devices, respectively, for connecting said devices in opposition and for indicating the differential output of said devices, an alpha emitting neutron reactive material supported by one of said devices in proximity to its output region, a quantity of a neutron insensitive isotope of said material, said isotope being supported by the other of said devices in proximity to its output region, said material and said isotope being substantially equally sensitive to background radiation such as gamma rays.

5. A radiation detector comprising a pair of semiconductor devices, each of said devices having P and N type regions and a P-N junction therebetween, circuit means coupled to the output regions of said devices, respectively, for connecting said devices in opposition and for indicating the differential output thereof, a quantity of boron-10 isotope, said isotope being supported by one of said devices in proximity to its output region, a quantity of boron-11 isotope, said last-mentioned isotope being supported by the other of said devices in proximity to its output region.

6. A radiation detector comprising a pair of semiconductor devices, each of said devices having P and N type regions and a P-N junction therebetween, circuit means coupled to the output regions of said devices, respectively, for connecting said devices in opposition and for indicating the differential output thereof, a quantity of lithium-6 isotope, said isotope being supported by one of said devices in proximity to its output region, a quantity of lithium-7 isotope, said last-mentioned isotope being supported by the other of said devices in proximity to its output region.

7. A radiation detector comprising a pair of semiconductor devices, each of said devices having P and N type regions and a P-N junction therbetween, circuit means coupled to the output regions of said devices, respectively, for connecting said devices in opposition and for indicating the differential output thereof, a quantity of $U^{235}$ isotope, said isotope being supported by one of said devices in proximity to its output region, a quantity of $U^{238}$ isotope, said last-mentioned isotope being supported by the other of said devices in proximity to its output region.

8. A radiation detector comprising a pair of semiconductor devices, each of said devices having P and N type regions and a P-N junction therebetween, circuit means connected to the P regions, respectively, of said devices, for connecting said devices in electrical opposition and for indicating the differential output thereof, a quantity of boron-10 isotope dispersed in the P region of one of said devices, a quantity of boron-11 isotope dispersed in the P region of the other of said devices, said boron-10 and said boron-11 isotopes forming electron acceptor materials in said devices, respectively, said boron-10 isotope in addition inducing an ionization-voltaic effect in the associated one of said devices upon impingement of thermal neutrons.

9. A radiation detector comprising first and second means for converting charged particles into an electrical current output, signal carrying means for connecting the outputs of said first and said second means in opposition, a quantity of a first material capable of emitting charged particles upon impingement of a given type of radiation, said material being supported in proximity to said first means, a quantity of a second material which is insensitive to said given radiation, both of said first and said second materials being substantially equally sensitive to radiation other than said given radiation, said second material being disposed in proximity to said second means, and means for indicating the differential output of said first and said second means.

10. A radiation detector for fast neutrons said detector comprising first and second means for converting charged particles into an electrical current output, current means for connecting the outputs of said first and said second means in opposition, a quantity of a first material capable of emitting charged particles upon impingement of thermal neutrons said material being supported in proximity to said first means, a quantity of a second material which is insensitive to said thermal neutrons, both of said first and said second materials being substantially equally sensitive to radiation other than said thermal neutrons, said second material being disposed in proximity to said second means, a moderating material supported adjacent each of said first and said second materials so that said fast neutrons are slowed to thermal velocities before reaching said first and said second materials, said moderating materials being substantially identical so that said first and said second converting means are substantially equally sensitive to background radiation, and means for indicating the differential output of said first and said second converting means.

11. A radiation detector comprising opposed semiconductor devices, each of said devices having adjacent regions of different conductivity types and a junction therebetween, circuit means for connecting the outputs of said devices in opposition, a quantity of neutron-reactive material, said material being supported by one of said devices in proximity to its output region, a quantity of neutron insensitive material, said last-mentioned material being supported by the other of said devices in proximity to its output region, and means for measuring the differential output of said devices.

12. A radiation detector comprising a pair of opposed semiconductor devices, each of said devices having adjacent regions of different conductivity types and a junction therebetween, circuit means connecting the outputs of said devices in opposition, similar quantities of a material being supported by the output regions of said devices, respectively, and only one of said output regions having its quantity of said material enriched in a neutron sensitive isotope thereof.

References Cited by the Examiner

UNITED STATES PATENTS

| | | | |
|---|---|---|---|
| 2,753,462 | 7/56 | Moyer et al. | 250—83.1 |
| 2,760,078 | 8/56 | Youmans | 250—83.3 |
| 2,816,234 | 12/57 | Ellis | 250—83.3 |
| 2,839,678 | 6/58 | DeWitz | 250—83.3 X |
| 2,847,585 | 8/58 | Christian | 250—83.3 X |

FOREIGN PATENTS 1,025,533  3/58  Germany.

RALPH G. NILSON, *Primary Examiner.*

ARTHUR GAUSS, G. R. OFELT, *Examiners.*